United States Patent [19]
Lehmann

[11] 3,969,736
[45] July 13, 1976

[54] PHOTOGRAPHIC CAMERA AND FLASH LAMP SELECTION SYSTEM

[75] Inventor: Walter G. Lehmann, Somerville, Mass.

[73] Assignee: Polaroid Corporation, Cambridge, Mass.

[22] Filed: Dec. 26, 1973

[21] Appl. No.: 427,939

[52] U.S. Cl. ................................ 354/127; 240/1.3; 240/37.1; 307/38; 307/157; 315/88; 315/90; 315/241 P; 354/143
[51] Int. Cl.² ......................................... G03B 15/04
[58] Field of Search ........... 354/126, 127, 128, 143, 354/147, 148; 240/1.3, 37.1; 315/241 P, 88, 90; 307/38, 157

[56] References Cited
UNITED STATES PATENTS

| | | |
|---|---|---|
| 3,608,451 | 9/1971 | Kelem .................................. 354/143 |
| 3,676,045 | 7/1972 | Watrous et al. ........................ 431/95 |
| 3,805,282 | 4/1974 | Erlichman............................. 354/144 |

*Primary Examiner*—L. T. Hix
*Assistant Examiner*—Kenneth C. Hutchison
*Attorney, Agent, or Firm*—Michael Bard; John W. Ericson

[57] ABSTRACT

A photographic camera and multi-flash arrangement therefor in which a multiplicity of linearly arrayed flash lamps mounted in a cartridge, wherein one or more of said lamps may be inoperative, may be automatically and sequentially sampled and the operative ones of said lamps automatically selected for effecting a photograhic exposure.

8 Claims, 5 Drawing Figures

PHOTOGRAPHIC CAMERA AND FLASH LAMP SELECTION SYSTEM

BACKGROUND OF THE INVENTION

This invention relates generally to photographic apparatus employing means for artificially illuminating a scene to be photographed and, more particularly, to photographic apparatus employing means for automatically selecting operative flash lamps, from an array comprising both operative and inoperative flash lamps, for effecting a photographic exposure.

Photographic flash systems in which a plurality of flash lamps are assembled within a disposable mounting have been favorably received by the consuming public. Certain of these mountings are fashioned as a cubic package in which four flash lamps and associated reflectors face outwardly through four surfaces of the cubic form and have come to be known as "flashcubes". The surfaces are moved sequentially into a flash illuminating orientation by a mechanical rotation assembly coupled with an exposure mechanism of a camera. Sequential switching between the flash lamps within the cube is accomplished as an adjunct to the mechanical rotation of the lamp mounting. Should an inoperative flash lamp be encountered in the course of taking flash illuminated photographs with the cube, the attempted exposure will be aborted, usually with an attendant loss of a frame of film.

In another multiple flash lamp arrangement, a plurality of flash lamps are mounted as an array within a singular disposable package. Typically, these units include a base member which supports a coplanar array of flash lamps and individual lammp reflectors behind each lamp. The lamps may be arranged in a single row, i.e., a linear array, or in other embodiments may be disposed in two or more interdigitated or parallel rows. The base member is adapted to be connected to a socket on the camera which aligns all of the lamps on the array in a direction such that their light output is substantially parallel with the optical axis of the camera's objective lens. The base member generally includes an insulating terminal board which supports a plurality of thin film conductive paths that are connected at one end to the lamp filament wires. Generally, there is one common conductive path to which one end of all the lamp filaments are connected. The opposite end of the lamp filaments are each connected to their own individual conductive path. Accordingly, contact to any lamp in the array may be made by making contact simultaneously to the common path and the individual paths.

Linearly arranged multiple flash lamp arrays such as described above have come to be known as "Flash-Bars" and in operation all of the lamps are oriented for providing scene illumination when ignited without recourse to moving or rotating either the flash lamps or their mountings between exposures. Examples of the type of multi-lamp flash units broadly described above may be found in U.S. Pat. Nos. 3,598,984 issued to Slomski and U.S. Pat. No. 3,598,985 issued to Harnden et al. on Aug. 10, 1971. Since no relative movement of the flash lamps is involved between exposures, switching systems are required to cause synchronous igniting of individual bulbs with each actuation of a photographic exposure system. Generally, firing circuits are provided which sequentially ignite the bulbs in a predetermined order from first to last with each actuation of a flash shutter synchronization switch. For example, U.S. Pat. No. 3,608,451, issued to Kelem on Sept. 28, 1971, discloses the use of a multi-contact switch having a rotary contact wiping member. The common lamp terminal is connected to one electrode of a battery within the camera. The individual lamp terminals are each connected to a separate contact on the switch. The contact wiping member is connected to the other battery electrode through a normally open flash ignition switch. After one lamp has been ignited, the flash lamp ignition switch is reopened and the contact wiping member is rotated one station to connect the next lamp in the array to the flash firing circuit.

In another arrangement, Goshima et al. in U.S. Pat. No. 3,438,315, issued on Apr. 15, 1969, discloses a multi-flash arrangement for cameras in which a plurality of flashbulbs can be either automatically or manually connected to a firing circuit. The firing circuit includes a battery and capacitor, a flash synchronizing contact, and a mechanical switch arm. The switch arm connects each of the flashbulbs sequentially to the firing circuit and is adapted for automatically switching as the film advances or for manual selection of the flashbulbs by a selector switch on the face of the camera.

A variety of other sequencing circuits for firing flashbulbs in successional order have been proposed. In one category of these circuits, sensing elements are arranged to respond to the heat or light output of an igniting flashbulb by varying either a mechanical or electrical parameter. Following this parameter variation, the circuits enable or arm select lamps within an array for successive firing. In most cases, however, such sequencing devices are either self-destructing when used or require excessive packaging volumes for camera mounted applications. Additionally, the systems are incapable of bypassing any inoperative flashbulbs which may be present in an array.

In still another arrangement, a cascading assembly of electrical resistors or the like is selectively coupled within a grouping of flash lamp circuits. During operation, lamp igniting currents are selectively attenuated to cause the flash lamps within the circuits to be fired in succession. In addition to being somewhat insensitive to any variations in power supply or circuit performance, this form of successive system is also incapable of bypassing inoperative flash lamps within an array and must rely on an open circuit condition at the terminals of any expended lamp to continue a lamp sequencing function.

In U.S. Pat. No. 3,618,492, issued to Ellin on Nov. 9, 1971, a photographic flash exposure system is described which is operative to sequentially ignite individual lamps within an array of flash lamps. The system automatically passes a monitoring current through each of the flash lamps during each exposure cycle to derive alignment signals which function to align a flash lamp sequencing circuit to bypass inoperative flash lamps. The Ellin device, while workable, provides a system of complex electronic networks and it is both difficult of manufacture and expensive.

In my copending applications Ser. Nos. 427,812 and 427,938 filed on even date and commonly assigned herewith, there are described electromechanical systems for automatically selecting operative flash lamps from an array of operative and inoperative lamps. These systems, while simple and effective, require either that a switch be mechanically intercepted each time a flash lamp is ignited or that the motion of the switch and the charging time of a capacitor be very precisely controlled.

SUMMARY OF THE INVENTION

The present invention is addressed to a flash lamp selecting system for use in conjunction with a photographic camera operable to effect photographic exposures in both an ambient illumination and photoflash lamp illumination mode. A plurality of electrical contacts are fixedly disposed within a photographic camera and each of said contacts is electrically connected to one terminal of a discrete one of a plurality of photoflash lamps when a flash lamp array is appropriately inserted into a socket assembly provided on the camera. The other terminals of each of said flash lamps are electrically connected via a common path (upon insertion of the lamp array into the socket assembly aforesaid) to the negative terminal of a battery power supply.

The positive terminal of the battery is serially connected through a switch to a rotary wiper arm connected within the camera and adapted to rotate past and successively engage each of the electrical contacts aforesaid.

A sensing means is connected to the switch and to the battery wiper arm circuit and functions to detect a current pulse in response to the ignition of a flash lamp.

An additional standby electrical contact is provided within the camera and is not connected to any of the flash lamps. The standby contact merely serves as a resting position for the rotary wiper arm. The rotary wiper arm is connected via a shaft through a spring motor to a control knob disposed on the outside of the photographic camera. A pawl assembly is disposed within the camera and is operatively connected to the shutter actuator button and to a ratchet wheel which is fixedly secured to the shaft.

In operation, the control knob is rotated counterclockwise to wind up the spring motor and the rotary wiper arm is initially secured at the standby contact by means of the pawl and ratchet assembly. At this time, the switch serially connected between the battery and the rotary wiper will be open and the conductive path to the wiper arm will be open circuited.

Upon depression of the shutter release button, the switch will be reset to the closed position and a conductive path between the battery and the rotary wiper arm will be established. At the same time, the pawl will disegage the ratchet wheel permitting the shaft to be rotated in a clockwise direction by the spring motor causing the rotary wiper assembly to successively engage each of the plural electrical contacts connected to each of the flash lamps. The rotary wiper will continue its clockwise travel until it has returned to the standby contact at which time the pawl (which has meanwhile been released by the release of the shutter actuator button) will have returned to its initial position and will engage the ratchet wheel. As the rotary wiper successively contacts each of the plurality of electrical contacts, it will complete the electrical path between the battery and the terminal of the flash lamp connected to the electrical contact such that the first operative flash lamp will be ignited. In response to the ignition of the first lamp, the sensing means will detect the pulse of current flowing through the lamp and will supply a signal to the switching means which will cause it to open and effectively disconnect the battery power supply. Upon reaching the next electrical contact after that corresponding to an operative flash lamp, the corresponding flash lamp to this successive electrical contact will not be able to ignite even if operative because the battery power supply will have been disconnected. Thus, should the first lamp in the array be operative, then it will immediately fire when the wiper engages its corresponding contact and none of the remaining lamps will be energized even though they all be operative when the wiper successively engages their corresponding electrical contacts. Inasmuch as an inoperative lamp essentially presents an open circuit to the battery power supply, only one flash lamp may be fired during each rotation of the wiper arm and only the first operative flash lamp encountered by the wiper arm will be fired.

Accordingly, it is an object of the present invention to provide a new and improved, easily fabricated, and low-cost mechanism for automatically and sequentially sampling each of the lamps in an array of lamps and selectively igniting an operative one of said lamps during each photographic exposure.

Another object of the present invention is to provide an improved electromechanical mechanism for automatically selecting operative flash lamps from amongst an array of operative and inoperative flash lamps.

Still another object of the present invention resides in the provision of means for use with a photographic camera operable in a photoflash mode for preventing the abort of a photographic cycle due to the presence of an inoperative flash lamp in an array of flash lamps connected to the camera.

DESCRIPTION OF THE DRAWINGS

Other objects and many of the attendant advantages of the instant invention will be better appreciated and said invention will become clearly understood by reference to the following detailed description when considered in conjunction with the accompanying drawings illustrating one embodiment of the instant invention, wherein.

DETAILED DESCRIPTION OF THE INVENTION

Figure 1:
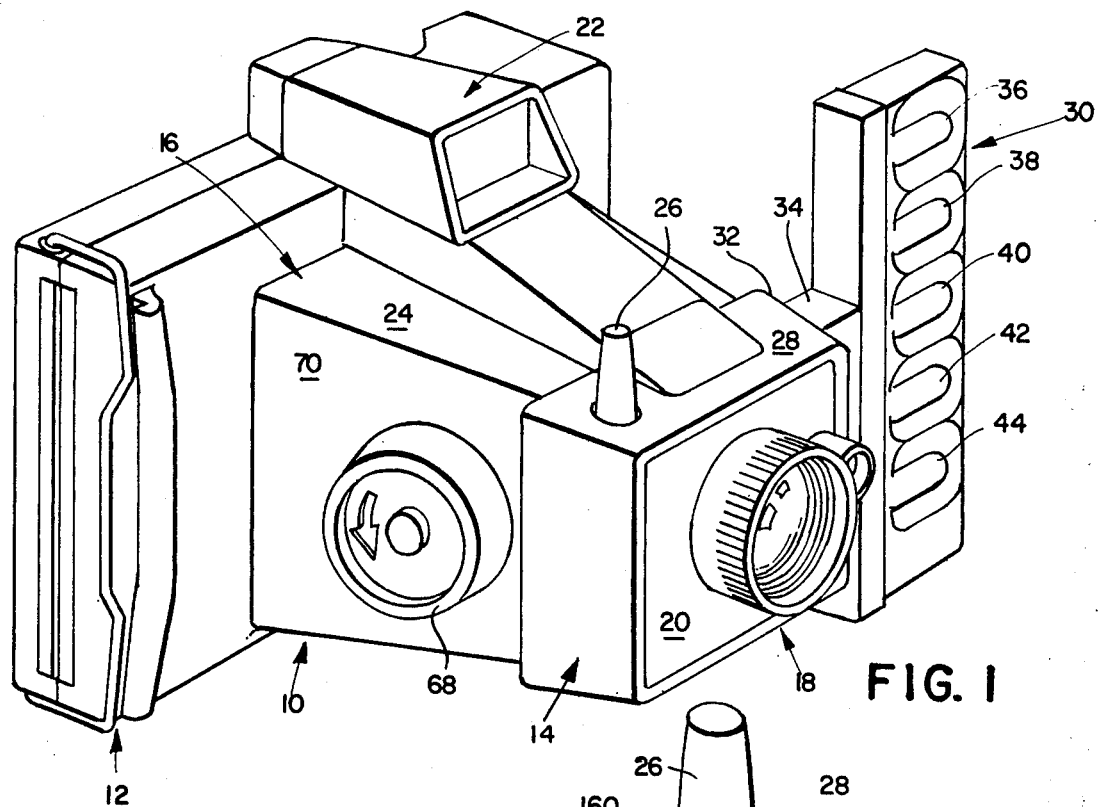
FIG. 1 provides a simplified perspective of a photographic camera employing the subject invention.

Referring to the drawings in more detail, and more particularly to FIG. 1, a photographic camera is illustrated generally at 10 and is seen to include a back portion 12 for receiving a film cassette (not shown) and an exposure control system housing 14. The exposure control system housing 14 is connected to the back portion 12 by means of a central portion 16 which is configured to define a lighttight exposure chamber housing. An objective lens assembly 18 which is disposed within a forward wall portion 20 of the exposure control system housing 14 functions to transmit light from a subject through the exposure chamber defined by the central portion 16 to properly expose a film unit within the back portion 12. The camera 10 is further provided with a viewfinder assembly 22 secured to a top wall portion 24 of the exposure chamber housing 16, and a shutter actuator button 26 for initiating a photographic exposure (in a well-known manner) is secured partially within the exposure control system housing 14 and extends upward through a top wall portion 28 of said housing 14 to be accessible to a user.

Figure 2:
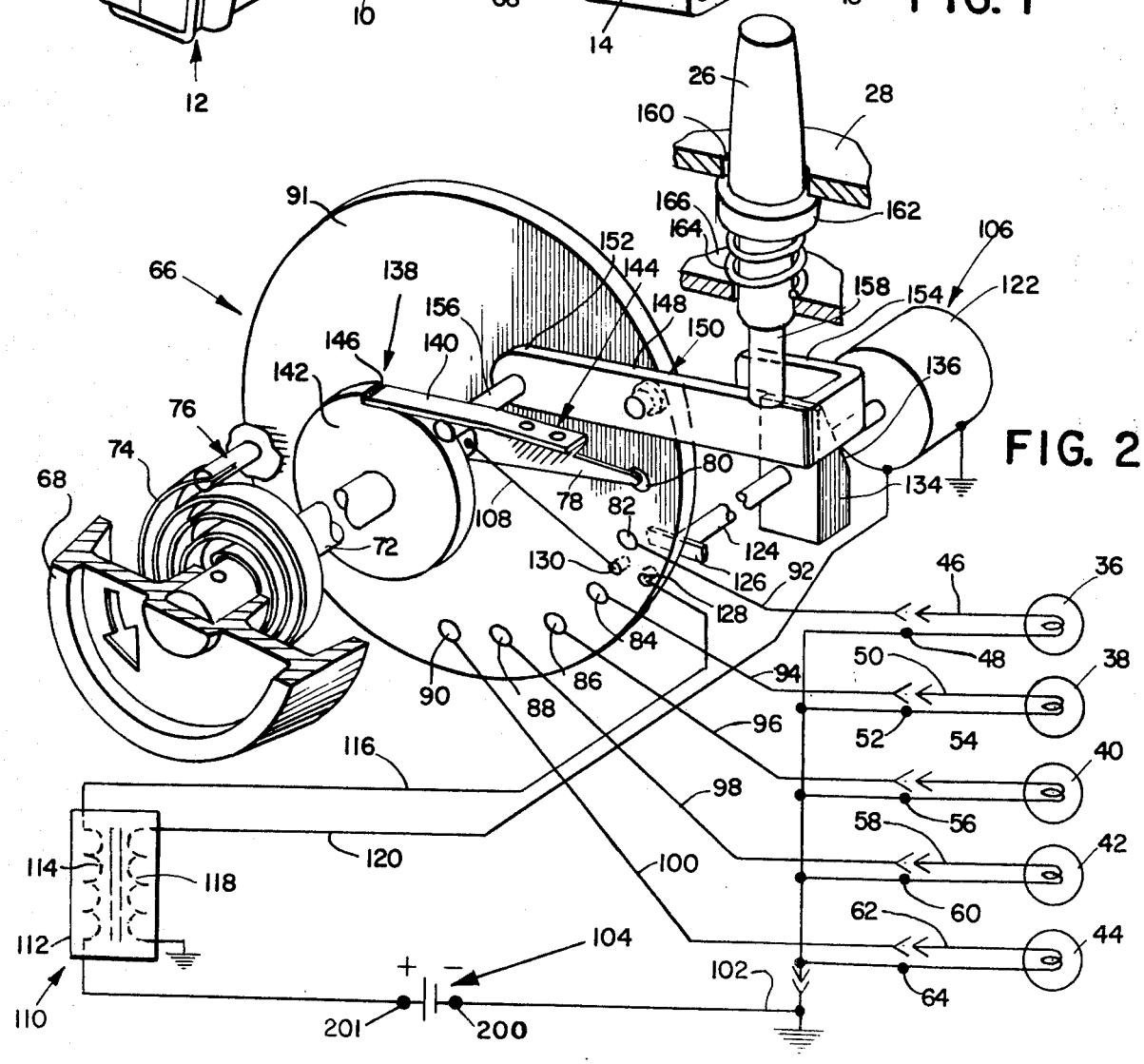
FIG. 2 provides a diagrammatic exploded perspective of one embodiment of the novel flash selection system of the subject invention.

A Flash-Bar 30 such as is manufactured by the General Electric Company and readily available throughout the United States is shown secured to a side wall 32 of the housing 14 via a socket assembly 34 which releasably retains the Flash-Bar 30 in a conventional and well-known manner. As best seen in FIG. 1, and as is commonly known, a plurality of flash 36, 38, 40, 42, and 44 are disposed in a linear array within the Flash-Bar 30, and as schematically illustrated in FIG. 2, each of the flash lamps 36, 38, 40, 42, and 44 is provided with a pair of input terminals 46 and 48, 50 and 52, 54 and 56, 58 and 60, and 62 anad 64, respectively.

The novel flash selection system of the subject invention is illustrated generally at 66 and is seen to include a control knob 68 positioned outward of a side wall portion 70 of the exposure chamber housing 16 and which is secured to one end portion of a shaft 72 in a well-known manner. The shaft 72 extends through the side wall 70 and its end portion adjacent the control knob 68 is secured to one end portion of a spring motor 74, the other end portion of which is fixedly secured within the exposure chamber housing 16 in a well-known manner, as at 76. The end portion of the shaft 72 remote from the control knob 68 is fixedly secured to an electrically conductive wiper arm 78 in a well-known manner and the wiper arm 78 extends radially outward from the shaft 72 and is rotatable therewith.

A plurality of electrical contacts 80, 82, 84, 86, 88, and 90 are secured to a circular insulating plate 91 and are radially disposed about the shaft 72 in a well-known manner so as to lie along a segment of a circle whose radius is approximately equal to the length of the conductive wiper arm 78. The electrical contacts 82, 84, 86, 88, and 90 are connected via conductive paths 92, 94, 96, 98, and 100, respectively, to the input terminals 46, 50, 54, 58, and 62, respectively, of the flash lamps.

Before proceeding, it should be noted that the wiper arm 78, the contacts 80 through 90, and the conductive paths 92 through 100 may be disposed within or without the photographic camera 10 in any conventional manner and for convenience and aesthetic reasons in the embodiment illustrated in FIG. 1 are disposed within the photographic camera 10. Furthermore, it will be noted that there is no conductive path between the contact 80 and any of the input terminals to the flash lamps 36 through 44. As will be more apparent, infra, the contact 80 serves as a standby contact for the initiation and termination of the lamp selection process.

Figure 3:
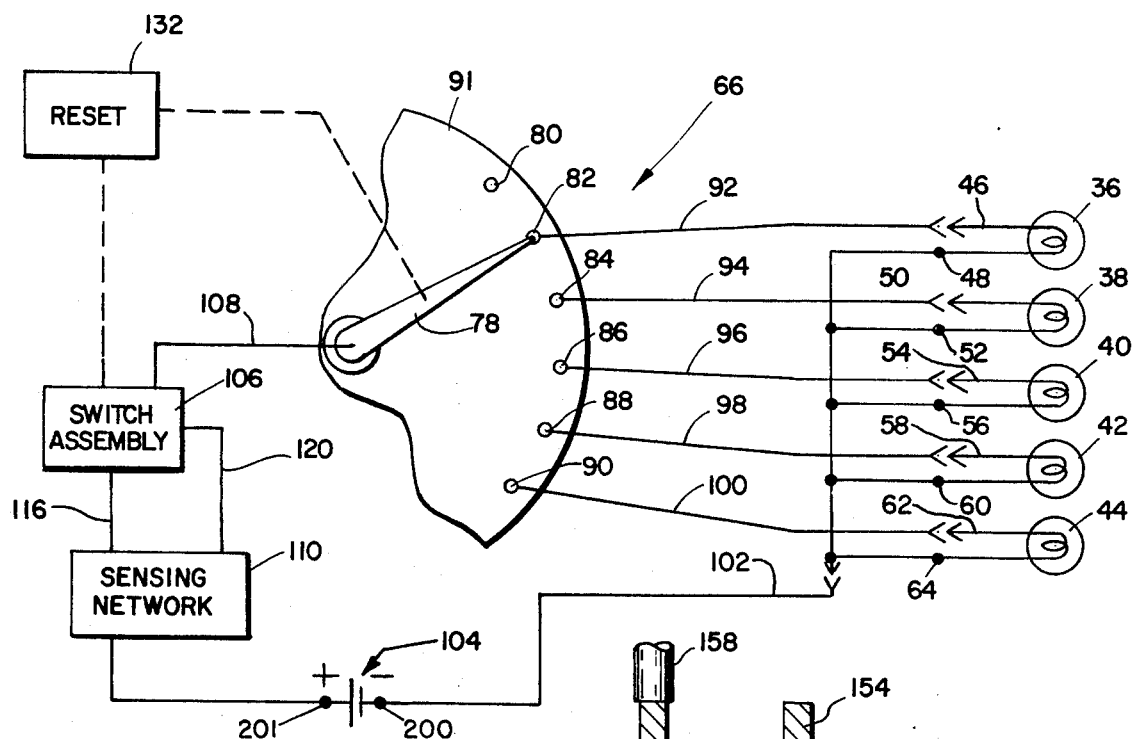
FIG. 3 provides a simplified schematic of the embodiment of FIG. 2.

As best seen in FIGS. 2 and 3, each of the input terminals 48, 52, 56, 60, and 64 of the flash lamps 36, 38, 40, 42, and 44, respectively, are connected to a common conductive path comprising a first common camera terminal 102. The negative terminal 200 of a battery 104 is connected to the common conductive path 102 while the positive terminal 201 of the battery 104 is connected through a switch assembly 106 and thence via a conductive path 108, comprising a second common camera terminal, to the end of the electrically conductive wiper arm 78 fixed to the shaft 72 as by a brush and ring assembly (not shown) in a conventional manner. A sensing network 110 is connected between the battery 104 and the switch assembly 106 so as to supply actuating signals to the switch assembly in response to current flow to one of the lamps, as will be more fully explained, infra.

As best seen in FIG. 2, the sensing network 110 may typically comprise a transformer 112 having a primary winding 114, serially connected between the positive side of the battery 104 and a conductive path 116, and a secondary winding 118 which is connected to the switch assembly 106 via a conductive path 120 (FIG. 3).

In the embodiment of FIGS. 2 and 3, the switch assembly 106 is seen to include a latching solenoid 122 having a shaft 124 which is fixedly secured at one end to a bus bar 126 (FIG. 2). The assembly 106 further includes a pair of spaced terminals 128 and 130 which are secured to the face of the plate 91 opposite the contacts 80 through 90 and which are connected to the conductive paths 116 and 108, respectively (FIG. 3), such that the conductive path between the positive side of the battery 104 and the wiper arm 78 is broken between the terminals 128 and 130.

The operation of the switch assembly 106 is such that in response to an electrical signal the solenoid 122 will withdraw the shaft 124 from an operative position (not shown) whereat the bus bar 126 is in contact with the terminals 128 and 130 so as to bridge the gap therebetween, to an initial position shown in FIG. 2.

Inasmuch as the solenoid 122 is of the latching variety, the bus bar 126 will remain in the position shown in FIG. 2 until the switch assembly is reset to the operative position (not shown) by a reset assembly shown schematically at 132 in FIG. 3. The reset assembly 132 includes a cam member 134 (FIG. 2) which is fixedly secured to the shaft 124 and which is provided with a ramp surface 136, the function of which will become more apparent, infra.

The flash selection system 66 is initially in the position shown in FIG. 2 with the wiper arm 78 in contact with the standby electrical contact 80 and is releasably secured in this position by means of a pawl and ratchet assembly 138 which is seen to include a cantilevered spring member 140 and a ratchet wheel 142. One end portion of the cantilevered spring member 140 is fixedly secured within the exposure chamber housing 16 as at 144 in a well-known manner, while the other end portion of the spring member 140 abuts a single arcuate tooth 146 which extends above the periphery of the ratchet wheel 142. A control level 148 is pivotally secured within the exposure chamber housisng 16 as at 150 and extends to an end portion 152 and an "L"-shaped opposite end portion 154. A pin 156 is fixedly secured to the end portion 152 of the control lever 148 and extends under the cantilevered spring member 140 so as to just contact same in the position shown.

It will be recalled that the shutter actuator button 26 extends partially within the exposure control system housing 14 and as best seen in FIG. 2 the shutter actuator button 26 extends to an elongated end portion 158 which engages the L-shaped end portion 154 of the control lever 148. The shutter release button 26 extends through an aperture 160 in said housing 14 and is secured within said housing 14 by means of a collar 162 and a coil spring 164. The coil spring 164 is disposed about the central portion of the shutter release button and extends between the collar 162 and a frame member 166 secured within the housing 14 and is preloaded so as to urge the collar 162 (which is of a diameter larger than that of the aperture 160) into abutment with the inner face of the top wall 28.

Considering the operation of one embodiment of the subject invention in more detail, it will be assumed that the mechanism is in position as shown in FIG. 2 with the wiper arm 78 contacting the standby contact 80 and with the bus bar 126 disengaged from the spaced terminals 128 and 130. Assume now that the user has properly framed his subject in the viewfinder 22 and has determined to initiate an exposure. Assume further that one or more of the flash lamps 36, 38, 40, 42, and 44 is inoperative.

To commence an exposure, the user will depress the shutter actuator button 26 which will pivot the control lever 148 clockwise as the elongated end portion 158 of the actuator button 26 pushes downward on the L-shaped end portion 154 of the control lever 148. Such clockwise movement of the control lever 148 will cause the pin member 156 extending from the end portion 152 thereof to lift the cantilevered spring 140 clear of the tooth 146 of the ratchet wheel 142, thus freeing the wheel and the shaft 72 secured thereto to rotate in a clockwise direction (looking into FIG. 2) under the influence of the spring motor 74. As the spring motor 74 begins to unwind, driving the shaft 72 and the ratchet wheel 142 in a clockwise direction, the user will have released the button 26 which will be returned to its uppermost position by the coil spring 164. The upward movement of the shutter release button 26 will cause its elongated end portion 158 to permit the control lever 148 to pivot in a counterclockwise direction under the influence of the cantilevered spring 140 in abutment with the pin 156 and such counterclockwise movement of the control lever 148 will permit the end portion of the cantilevered spring 140 to contact the periphery of the ratchet wheel 142 and again engage the tooth 146 when the ratchet wheel 142 and the shaft 72 have completed one revolution.

Figure 4:
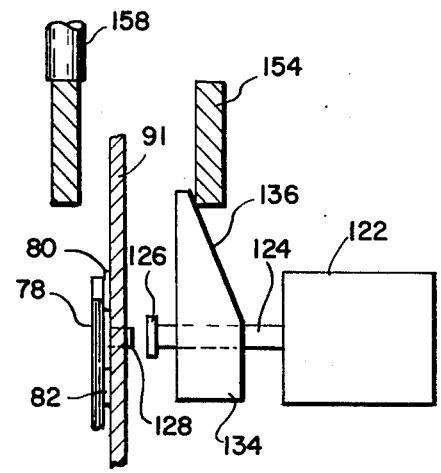
FIG. 4 provides a fragmentary detail, partly in section, of a portion of the mechanism of FIG. 2.

As best seen in FIG. 4, with the system in the position shown in FIG. 2, the L-shaped end portion 154 of the control lever 148 will abut the ramp surface 136 of the cam member 134. Thus, as the control lever 148 begins to pivot under the influence of the actuator button 26, the end portion 154 will drive the cam member 134 and the shaft 124 (which is secured thereto) to reset the switch assembly 106 and cause the bus bar 126 to engage the terminals 128 and 130.

Upon the resetting of the switch assembly 106, a conductive path will be established between the positive side of the battery 104 and the conductive wiper arm 78.

Thus, upon the momentary depression of the shutter actuator button 26, the wiper arm 78 will be caused to rotate in a clockwise direction with the shaft 72 starting from the standby contact 80 engaging the contacts 82, 84, 86, 88, and 90 and finally returning to the standby contact 80. Until such time as the wiper arm 78 engages one of the electrical contacts 82 through 90 associated with an operative flash lamp, the electrical path from the wiper arm 78 to the negative side of the battery 104 will remain open-circuited and there will be no current flowing through the sensing network 110. At such time as the wiper arm 78 engages one of said contacts 82 through 90 associated with an operative one of said flash lamps 36 through 44 the electrical path through the switch assembly 106 will be completed, the lamp will ignite, and the sensing network 110 will detect a current pulse.

Responsive to this current pulse, a signal will be sent by the sensing network, via the winding 118 and the conductive path 120 to the solenoid 122 causing it to latch into the position illustrated in FIG. 2 and the conductive path from the battery 104 to the wiper arm 78 will be open circuited.

Should the wiper arm 78 move on to an electrical contact associated with another operative flash lamp during its cycle, after once successfully igniting an operative flash lamp, the open circuit condition effected by the latching of the solenoid 122, as aforesaid, will prevent the successful ignition of another flash lamp. The wiper arm 78, once actuated by the depression of the button 26, will continue to rotate and complete its cycle by returning to the standby contact 80, whereat it will be retained by the pawl and ratchet assembly 138 until a new cycle is started by the depression of the actuator button 26.

Thus, it is seen that the flash selection system 66 will select and ignite only a single operative one of the flash lamps 36 through 44 in response to a momentary depression of the shutter actuator button 26. Accordingly, only one flash lamp will be ignited during each photographic cycle (which, of course, is initiated by depression of the shutter release button 26 in a well-known manner) and as long as some of the flash lamps 36 through 44 is operative, it will be selected and properly ignited so that a photographic cycle will not be aborted due to the presence of an inoperative flash lamp.

It should be noted that the spring motor 74 may be so designed as to store sufficient energy for only a single photographic cycle or for multiple photographic cycles. In any event, there will come a time such that when the wiper arm 78 has completed a cycle and come to rest at the standby contact 80, insufficient energy will remain stored in the spring motor to cause the wiper arm 78 to sweep the contacts 82, 84, 86, 88, and 90 and return to its standby position. At this time, it is merely necessary for the user to rotate the control knob 68 in a counterclockwise direction a sufficient number of full turns to store the necessary driving energy for the system. To avoid undesired lamp ignition, either the user must insure that the bus bar 126 is disengaged from the terminals 128 and 130, or the array of lamps 30 must be withdrawn from the socket assembly 34.

It will be recalled that the pawl and ratchet assembly 138 includes a cantilevered spring member 140 and it should be noted that this spring member 140 will resiliently ride over the periphery of the ratchet wheel 142 during counterclockwise rotation of the control knob 68 but prevent clockwise rotation of the ratchet wheel 142, and hence the shaft 72, by engaging the face of the single arcuate tooth 146. Accordingly, the user will be free to wind up the system 66 while the shaft 72 and its associated components will be free to unwind at the appropriate time.

Referring again to FIG. 5, an alternate embodiment to that of FIG. 3 is illustrated in simplified schematic, wherein the flash selection system utilizes the same components as the system of FIG. 3 except as detailed hereinafter. For convenience, the same identification numerals have been used to identify components common to the embodiments of FIGS. 3 and 5.

Figure 5:
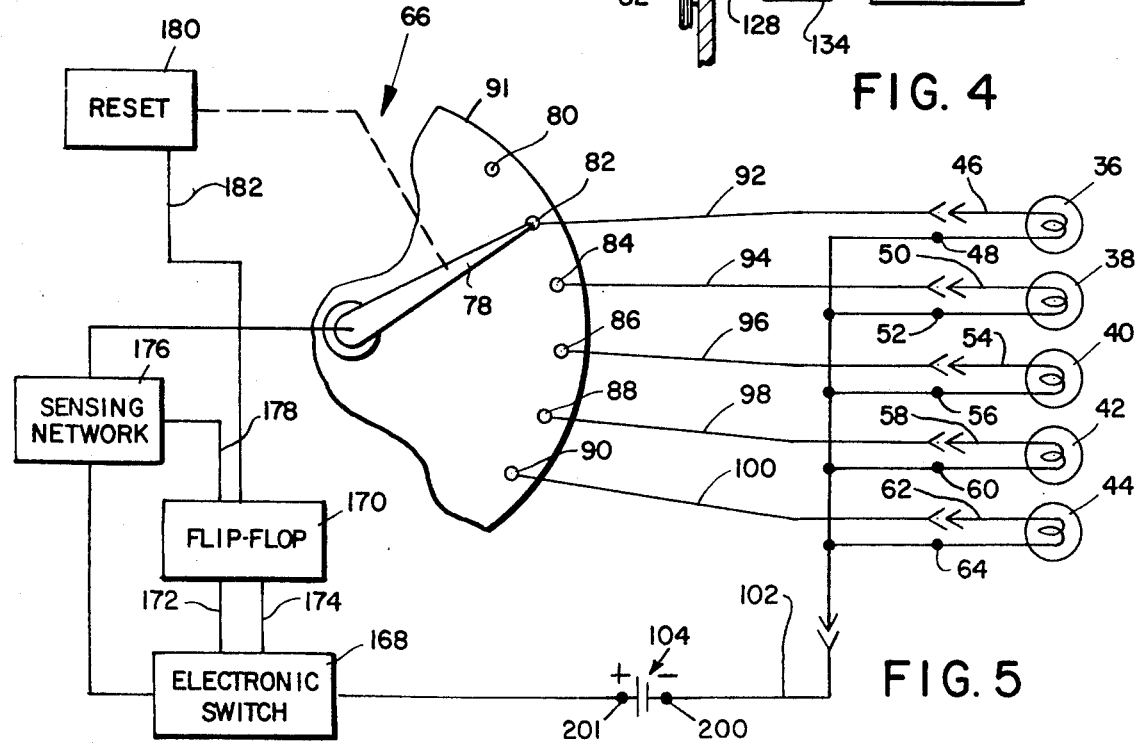
FIG. 5 provides a simplified schematic of another embodiment of the invention.

The embodiment of FIG. 5 differs from that of FIG. 3 mainly in that an electronic switch 168 is serially inserted into the electrical path, between the positive side of the battery 104 and the wiper arm 78, in place of the electromechanical switch assembly 106 (FIG. 3).

A bistable multivibrator or flip flop 170 is connected to the electronic switch 168 so as to provide alternate signals thereto at outputs 172 and 174. Typically, the electronic switch 168 may comprise a common transistor connected to said flip flop 170 so that its base receives biasing signals from the outputs 172 and 174 forward biasing and not forward biasing, respectively, the base emitter junction of said transistor.

A sensing network 176 is serially connected between the switch 168 and the wiper arm 78 and provides an output signal to the flip flop as at 178. The sensing network 176 functions in a manner analogous to the sensing network 110 (FIG. 3) to detect the presence of a current pulse due to the ignition of one of the lamps 36 through 44. A reset network 180, generally similar to the network 132 (FIG. 3), is connected to release the wiper arm 78 upon depression of the shutter actuator button 26 in exactly the same way as the network 132. The network 180 differs from the network 132 mainly in that it incorporates well-known means for supplying an electrical output signal as at 182, upon the actuation of the button 26, instead of the cam member 134 (FIG. 2). The output signal at 182 is sent to the flip flop 170 causing said flip flop 170 to change state and supply an output signal to the switch 168 at 172.

In operation, it may be assumed that the flip flop 170 is initially in a state such that it is supplying a biasing signal to the switch 168 at 174. With the biasing signal at 174, the switch 168 will be open and the electrical path between the positive side of the battery 104 and the arm 78 will effectively be open circuited.

Upon depression of the actuator button 26, the wiper arm 78 will begin to rotate and successively engage the contacts 82 through 90 in exactly the same manner as the embodiment of FIG. 3. At the same time, the reset network 180 will supply a signal to the flip flop 170 as at 182 which will cause the flip flop to change state, as aforesaid, and provide an output to the electronic switch 168 at 172 which will forward bias the switch 168 closing it and completing the current path between the positive side of the battery 104 and the wiper arm 78. When the arm 78 engages the first of the contacts 82 through 90 associated with an operative lamp, current will flow and the lamp will ignite. As current flows through the circuit, the sensing network 176 will detect same and provide an output signal to the flip flip 170 at 178 which will cause the flip flop to change state and provide an output signal to the switch 168 at 174. This change in the output signal to the switch 168 will cause it to open circuit the path between the positive side of the battery 124 and the wiper arm 78 and the system 66 will be disabled until the arm 78 has returned to the standby contact 80 and the button 26 is again actuated.

Thus, it is seen that the system of FIG. 5 functions as the system of FIG. 3 to insure the ignition of only a single operative one of the flash lamps 36 through 44 in response to a momentary depression of the shutter actuator button 26. As in the system of FIG. 3, as long as one of the flash lamps 36 through 44 is operative, it will be selected and properly ignited so that a photographic cycle will not be aborted due to the presence of an inoperative flash lamp.

It can readily be seen that many variations and modifications of the present invention are possible in the light of the aforementioned teachings, and it will be apparent to those skilled in the art that various changes in form and in arrangement of components may be made to suit requirements without departing from the spirit and scope of the invention. It is, therefore, to be understood that within the scope of the appended claims the instant invention may be practised in a manner otherwise than is specifically described herein.

What is claimed is:

1. A photographic camera operable to produce an artificially illuminated photographic exposure in conjunction with an array of flashlamps of the kind having an individual terminal for each lamp in the array and a common terminal connected to all of the lamps in the array, said camera comprising, means for releasably receiving such an array and comprising a set of mutually insulated camera terminals for contacting the terminals of the array, said set including a first common camera terminal adapted to engage the common terminal of the array; means for initiating a photographic exposure cycle; first and second power supply terminals adapted to be connected to a source of electrical energy; a second common camera terminal; first switching means connected to said exposure cycle initiating means and operable thereby to sequentially connect all of said set of camera terminals except said first common terminal to said second common terminal during each exposure cycle; second switching means operable to open and close a circuit path connecting said first common terminal, said second common terminal, and said power supply terminals in series; and means for detecting the ignition of a lamp in an array received in said camera for operating said second switching means to open said path.

2. The apparatus of claim 1, further comprising means for resetting said first switching means to an initial state in which none of said set of camera terminals is connected to said second common terminals, and means responsive to the operation of said exposure initiating means for operating said second switching means to to close said path.

3. The invention as delineated in claim 1 wherein said first switching means includes a shaft rotatably secured to said camera and conductive means connected to said shaft and extending radially therefrom to sequentially engage said terminals of said set, except said first common terminal, in respsonse to the rotation of said shaft.

4. The invention as recited in claim 3 further including motor means connected to said shaft for effecting the rotation thereof and means for securing said shaft in an initial position corresponding to said initial condition.

5. The invention pursuant to claim 4 wherein said initial position securing means includes a ratchet wheel connected to said shaft and rotatable therewith and pawl means movable from a position engaging and restraining said ratchet wheel to a position out of engagement therewith in response to actuation of said initiating means whereby said shaft may be rotated by said motor means.

6. The invention as defined in claim 5, further including means for automatically returning said pawl means into engagement with said ratchet wheel subsequent to the actuation of said initiating means to releasably secure said shaft and said ratchet wheel in said initial position upon their return thereto.

7. The invention according to claim 1, wherein said second switching means comprises an electromechanical switch mechanically resettable by said photographic exposure cycle initiating means.

8. The invention pursuant to claim 1, wherein said second switching means includes an electronic switch serially connected in circuit with said power supply terminals and said common terminals.

* * * * *

UNITED STATES PATENT OFFICE
CERTIFICATE OF CORRECTION

Patent No. 3,969,736          Dated  July 13, 1976

Inventor(s)   Walter G. Lehmann

It is certified that error appears in the above-identified patent and that said Letters Patent are hereby corrected as shown below:

The term of this patent subsequent to

August 19, 1992, has been disclaimed.

Signed and Sealed this

Twenty-first Day of September 1976

[SEAL]

Attest:

RUTH C. MASON
*Attesting Officer*

C. MARSHALL DANN
*Commissioner of Patents and Trademarks*